ical and 2 its lower part which
United States Patent Office 3,584,097
Patented June 8, 1971

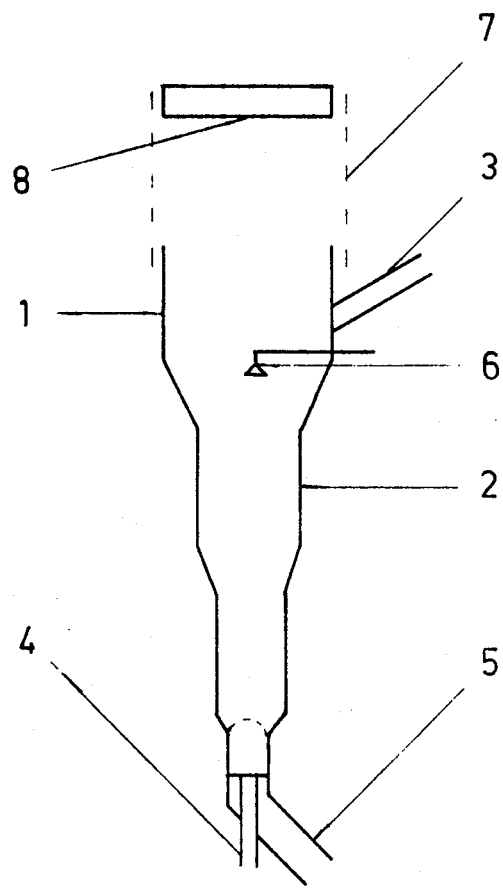

3,584,097
PROCESS FOR GRANULATING A MOLDING POWDER
Bengt E. O. Hellström, Jan E. Gunnäng, and Nils-Åke B. Svensson, Perstorp, Sweden, assignors to Perstorp AB, Perstorp, Sweden
Filed June 2, 1969, Ser. No. 829,264
Claims priority, application Sweden, June 11, 1968, 7,861/68
Int. Cl. B01j 2/16
U.S. Cl. 264—117                                                 5 Claims

ABSTRACT OF THE DISCLOSURE

Process for the production of granulated moulding powder characterized by subjecting pulverulent powder to an upward flowing, pulsating air pressure stream in a container and injecting a liquid binder to the blown cloud of particles, simultaneously with the air pulses.

---

The present invention relates to a process for the production of granulated moulding powder consisting of e.g. melamine or urea resins containing cellulose fillers.

Several methods for the production of such granulated moulding powder are known. In these processes usually finished, dried, pulverulent moulding powder is ground together with lubricants, pigments, catalysts etc. in a ball mill. To get a homogeneous powder, this grinding must proceed for several hours.

The pulverulent moulding powder thus manufactured is then often formed to briquets, which are crushed, ground and sifted to obtain granulated moulding powder.

The above-mentioned complicated method has been significantly simplified by the present invention. According to this, a process for the production of granulated moulding powder has been obtained, which process is characterized in that pulverulent powder, which optionally in advance has been blended with pigments, catalyst, lubricant and the like, is subjected to pressure air pulses in a container when simultaneously with the air pulses granulating liquid is supplied so that granules are formed, which optionally are dried in said container by following warm air.

If a pulverulent mass pre-mixed with pigment, catalyst, lubricant and the like is inserted in the granulating container, the granulating may start immediately after having filled the container to a suitable degree, by means of pressure air pulses during simultaneously addition of granulating liquid. The air pulses last usually 0.5–5.0 seconds, and the intervals between the pulses 0.5–10 seconds. Such short pulses are necessary when equal granules are wished. By longer pressure pulses, a certain degree of fractionation occurs. During the air pulses, the pulverulent mass in the container expands to a cloud of particles, which in this condition is over-sprayed with granulating liquid, e.g. water, through nozzle pipes arranged in the container.

When the pressure air stream is shut off, the powder falls down and is baked together to granules. This effect may be enhanced by vibrators arranged at the sides of the container. By doing so, the pressure pulses become more effective and a higher volume weight of the granules is obtained.

The size of the granules may easily be changed by varying the number of pressure pulses. If the amount of the pulverulent powder charged in the container is also changed, even the hardness of the granules or the processing time may be changed.

Catalyst, pigment, lubricant and the like may even be blown into the granulating container through nozzle pipes at the lower part of the container, if not a completely blended, pulverulent mass is charged into the container. These nozzle pipes may be separate or combined with the inlet for the pressure air. To get a homogeneous powder mixture it is then only necessary that pressure air pulses without simultaneous addition of granulating liquid is initially used. Thereafter the granulating step is started as described above.

When the granulation has proceeded for some time but is not yet finished, the liquid and air supply may be stopped and dry, pulverulent mass may be charged into the container. The air pulses are thereafter started again without addition of granulating liquid. By this method, granules with a drier surface are obtained which is advantageous for the following drying, which can be made by blowing warm air into the granulating container after having stopped the granulating step. The drying may of course also be carried out in a separate drier.

The invention will be described more in detail in connection with the attached figure and the following embodiment examples.

The figure shows a granulating container intended for the production of moulding powder according to the invention. The designation 1 means the upper part of the container which is cylindrical and 2 its lower part which is funnel-shaped. 3 is the inlet for pulverulent material and 4 the inlet for pressure air. 5 is the outlet for granulated powder and 6 is a nozzle pipe for the addition of granulating liquid. 7 is a filter and 8 a cap. The shape of the container may be altered compared with the one shown in the figure, but the shape must be such that turbulence is obtained by the air pulses.

In the examples a pulverulent mass blended with pigment, catalyst etc. has been charged in the container.

EXAMPLE 1

40 kg. pulverulent mass was charged into the granulating container via the inlet 3. The pulsating pressure air was introduced through the pipe 4. The granulating process was carried out for 3 minutes during which period granulating liquid was added. Thereafter the granulating proceeded for 5 minutes without addition of liquid. Then, 5 kg. of pulverulent mass was added into the container through the inlet 3. The granulating was then continued for another 12 minutes, whereupon the granules were taken out from the container through the outlet 5. The working cycle could thereafter be started again. The granules obtained had a volume weight of 0–70 g./cm.$^3$. The flowability of the granules was measured by allowing a certain amount of granules to pass through a funnel. The time used was recorded and a comparative value was obtained. The time in this example was 14 seconds. A short time and accordingly a good flowability is advantageous for granulated moulding powder. A sifting analysis of the granules was made. The sieves used had a mesh size of 0.12; 0.30 and 1.5 mm. 12 percent of the granules passed through the smallest meshes, 40 percent through the medium and 99 percent through the largest meshes.

EXAMPLE 2

The process according to Example 1 was repeated with the change that 45 kg. pulverulent mass was charged into the container and no more pulverulent mass was later introduced. The volume weight became 0.72 g./cm.$^3$ and the flow velocity 13 seconds. The sifting analysis was 1.12 and 95 percent.

The invention is not limited to the embodiment examples shown as these can be modified in different ways within the scope of the invention.

What is claimed is:

1. A process for producing granules from a molding powder, comprising:
    (a) charging a mass of said molding powder into a granulating container,
    (b) introducing an upwardly flowing pulsating pressure air stream from below said charge into said container to expand said powder into a cloud of particles, the air pulses lasting 0.5–5.0 seconds and the intervals between pulses being 0.5 to 10 seconds,
    (c) overspraying said cloud of particles with water as a granulating liquid simultaneously with said air pulses causing said moistened particles to form granules, and
    (d) drying said granules.

2. The process of claim 1 in which said powder has been blended with at least one material selected from the group consisting of a pigment, a catalyst and a lubricant prior to step (a).

3. The process of claim 2 in which said one material is blown into said granulating container prior to step (a).

4. The process of claim 1 in which said formed granules are dried by warm air within said granulating container.

5. The process of claim 1 in which said pulsating air stream and water spraying are stopped; dry molding powder is added to said container and the pulsating air stream started again.

References Cited
UNITED STATES PATENTS

| | | | |
|---|---|---|---|
| 2,742,381 | 4/1956 | Weiss et al. | 23—267.3 |
| 3,207,824 | 9/1965 | Wurster et al. | 18—1A |
| 3,493,350 | 2/1970 | Howard | 264—117 |

ROBERT F. WHITE, Primary Examiner

J. R. HALL, Assistant Examiner

U.S. Cl. X.R.

264—121